US009575989B2

(12) United States Patent
Diederich et al.

(10) Patent No.: US 9,575,989 B2
(45) Date of Patent: Feb. 21, 2017

(54) METHOD FOR FILE HANDLING IN A HIERARCHICAL STORAGE ENVIRONMENT AND CORRESPONDING HIERARCHICAL STORAGE ENVIRONMENT

(71) Applicant: International Business Machines Corporation, Armonk, NY (US)

(72) Inventors: Michael Diederich, Mainz (DE); Thorsten Muehge, Mainz (DE); Erik Rueger, Mainz (DE); Rainer Wolafka, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 489 days.

(21) Appl. No.: 14/229,553

(22) Filed: Mar. 28, 2014

(65) Prior Publication Data

US 2014/0304309 A1 Oct. 9, 2014

(30) Foreign Application Priority Data

Apr. 9, 2013 (GB) .................................. 1306393.8

(51) Int. Cl.
*G06F 7/00* (2006.01)
*G06F 17/30* (2006.01)
(52) U.S. Cl.
CPC ... *G06F 17/30221* (2013.01); *G06F 17/30073* (2013.01)
(58) Field of Classification Search
CPC ................................................. G06F 17/30073
See application file for complete search history.

(56) References Cited

U.S. PATENT DOCUMENTS 7,779,097 B2 8/2010 Lamkin et al.
2006/0010169 A1 1/2006 Kitamura

FOREIGN PATENT DOCUMENTS

EP 2551783 1/2013

OTHER PUBLICATIONS

United Kingdom Search Report from application No. GB1306393.8 dated Oct. 16, 2013.
Schroder et al., "A Semantic Extension of a Hierarchical Storage Management System for Small and Medium-sized Enterprises," Proceedings of the 1st International Workshop on Semantic Digital Archives (SDA 2011), pp. 23-36.
Wikipedia definition 'NAS': http://en.wikipedia.org/wiki/Network-attached_storage, last modified on Mar. 25, 2014.
(Continued)

*Primary Examiner* — Ajith Jacob
(74) *Attorney, Agent, or Firm* — Zilka-Kotab, PC (57) ABSTRACT

A method for file handling in a hierarchical storage environment includes receiving a new document for storage, and triggering and/or initiating a new document notification process upon receipt of the new document. The new document notification process includes scanning the new document for a set of keywords and/or references; creating enhanced metadata for the new document, wherein the enhanced metadata includes the set of keywords and/or references from said scanning; storing the enhanced metadata in a file system; and evaluating the enhanced metadata via a relationship analyzing process to produce a priority list defining a likelihood of possible access. The method also includes storing the new document in a storage tier of a hierarchical storage environment according to the priority list.

15 Claims, 6 Drawing Sheets

(56) References Cited

OTHER PUBLICATIONS

Wikipedia definition 'tiered storage': http://en.wikipedia.org/wiki/Tiered_storage, last modified on Mar. 27, 2014.
Gantz et al., "The Digital Universe Decade—Are You Ready?" IDC-IVIEW, May 2010, pp. 1-16.
Gantz et al., "Extracting Value from Chaos," IDC-IVIEW, Jun. 2011, pp. 1-12.
Ragnet et al., "Beyond Document 2.0: The Future of Documents," Xerox Global Services, Jan. 2007, pp. 1-11.

METHOD FOR FILE HANDLING IN A HIERARCHICAL STORAGE ENVIRONMENT AND CORRESPONDING HIERARCHICAL STORAGE ENVIRONMENT

RELATED APPLICATIONS

This application claims priority to United Kingdom Patent Application No. 1306393.8, filed Apr. 9, 2013, which is herein incorporated by reference.

BACKGROUND

The present invention relates in general to the field of file storage management, and in particular to a method for file handling in a hierarchical storage environment and a corresponding hierarchical storage environment. Still more particularly, the present invention relates to a data processing program and a computer program product for file handling in a hierarchical storage environment.

The technical area of this invention concerns the overall enhancement of file storage management. This is in an area of tremendous growth hence technologies increasing the effectiveness are very valuable.

File access typically is provided through network attached storage (NAS) systems. Tiered data storage is a technique which automatically moves data between high-cost and low-cost storage media based on rules and policies.

A request to access data that was migrated from "higher" (faster) to "lower" (slower) level storage tier typically results in a longer response time; sometimes significantly longer response time. In some tiered storage environments this might involve recalling data from removable media such as tape. In such cases it usually takes several minutes, and even up to hours, before a user can access the data if all tapes drives are currently in use. For users trying to access this data, such long response times create a bad experience, and may be simply not acceptable in certain scenarios. One example is a student in a library trying to access a series of related articles and/or files via a console that have been moved to a lower level storage tier.

Retrieving files in tiered storage environments, especially files migrated to lower level storage tiers, may present several challenges. For instance, users expect immediate file access (and thus a good user experience), however it can take a long time to actually access the data due to the slower performance of lower level storage tiers or the slow performance associated with the recall process from removable media. Moreover, users often require access to multiple files, which may be content related independent from the actual storage location or storage tier; thus the overall response time may accumulate over multiple file access. Moreover still, while hierarchical storage environment or so called storage tiering may be used because of its cost effectiveness, it may not be economic to keep all data always in the highest level storage tier. Further, conventional solutions for file access in tiered storage environments may offer limited connection between a conventionally specified set (e.g. a prior art set) of metadata associated with a file and the probability that a file will be used again.

BRIEF SUMMARY

The technical problem underlying the present invention is to provide a method for file handling in a hierarchical storage environment and a corresponding hierarchical storage environment, which are able to improve file access and to solve the above mentioned shortcomings and pain points of prior art file access in hierarchical storage environments.

According to one embodiment, a method for file handling in a hierarchical storage environment includes receiving a new document for storage; and triggering and/or initiating a new document notification process upon receipt of the new document. The new document notification process includes scanning the new document for a set of keywords and/or references; creating enhanced metadata for the new document, wherein the enhanced metadata includes the set of keywords and/or references from said scanning; storing the enhanced metadata in a file system; and evaluating the enhanced metadata via a relationship analyzing process to produce a priority list defining a likelihood of possible access. The method additionally includes storing the new document in a storage tier of a hierarchical storage environment according to the priority list.

According to another embodiment, a hierarchical storage environment includes at least two different storage tiers; and a file system with a content related tiering engine, where the content related tiering engine is configured to: trigger and/or implement a new document notification process in response to a received new document for storage; scan the new document for a set of keywords and/or references; create enhanced metadata for the new document, the enhanced metadata including the set of keywords and/or references said scan result; store the enhanced metadata in the content related tiering engine; evaluate the enhanced metadata via a relationship analyzing process to produce a priority list defining a likelihood of possible access; and store the new document in a storage tier of the hierarchical storage environment according to the priority list.

According to yet another embodiment, a computer program product includes a computer readable storage medium having program code embodied therewith, the program code readable and/or executable by a processor to cause the processor to: receive a new document for storage; and initiate a new document notification process upon receipt of the new document. The new document notification process includes scanning the new document for a set of keywords and/or references; creating enhanced metadata for the new document, wherein the enhanced metadata includes the set of keywords and/or references from said scanning; storing the enhanced metadata in a file system; and evaluating the enhanced metadata via a relationship analyzing process to produce a priority list defining a likelihood of possible access. The program code is further readable and/or executable by the processor to store the new document in a storage tier of a hierarchical storage environment according to the priority list.

The above, as well as additional purposes, features, and advantages of the present invention will become apparent in the following detailed written description.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for fast content related file access in a hierarchical storage environment.

As will be appreciated by one skilled in the art, aspects of the present invention may be embodied as a system, a method, and/or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As discussed previously, in conventional solutions for file access in a tiered storage environment, files are migrated from very fast disk storage media to lower cost media with less performance and/or longer response time. In such solutions, the tiering may be based on migration and placement policies using a prior art set of metadata. A simple example for such a policy would be to automatically move all data and/or files from a higher to a lower level storage tier if there was no access in a given timeframe. Additionally, an example of a prior art set of metadata may comprise the date and time when the rule is evaluated, that is, the current date and time; date and time when the file was last accessed; date and time when the file was last modified; fileset name; file name or extension; file size; user identification and group identification.

The actual storage tier the files reside on as well as the actual migration process of the data is transparent to the user. The user sees no change in the file directory view. However, in cases where the user wants to access a file being already migrated to tape, it might take up to 10-15 minutes to access it; sometimes even significantly longer.

The article "A Semantic Extension of a Hierarchical Storage Management System for Small and Medium-sized Enterprises" by Axel Schroder et. al, Proceedings of the 1st International Workshop on Semantic Digital Archives (SDA) 2011, discloses a semantic storage extension (SSE) for existing hierarchical storage management systems that allows them to exploit semantic relations between files and use them for a more efficient and more intelligent data management. The disclosed approach enhances traditional hierarchical storage management systems regarding migration, deletion, and retrieval operations by making use of semantic relations between files and contextual knowledge. Thereby a predictive file management is possible, which contributes to an increasing system performance and a better user experience. To this end, the semantic storage extension (SSE) uses extracted features of documents to define relations between them and also offers the possibility to specify additional knowledge by a domain expert. However, some embodiments of the disclosed hierarchical storage management systems disclosed herein focus on the content and metadata of the file only.

Moreover, to improve the short comings and problems of conventional solutions for file access in a tiered storage environment, such as those outlined above, various embodiments of the present invention introduce: systems, methods and computer program products for an inventive content related tiering engine in order to improve response time (user experience) in tiered network attached storage (NAS) and/or file storage environments; new file metadata concepts that permit content relationships between files, which are used to automatically migrate data between different storage tiers; and new systems, methods and computer program products to use the new metadata concepts to transparently manage the migration of data between different storage tiers.

Accordingly, in one general embodiment of the present invention, a method for file handling in a hierarchical storage environment comprising means for content scanning, content retrieving and content archiving, comprises the steps of: receiving a new document for storage triggers a new document notification process, which scans the received new document for a set of keywords and references; creates enhanced metadata for the new document including the scan result; stores the metadata in a file system; and evaluates the enhanced metadata by a relationship analyzing process resulting in a priority list which defines a likelihood of possible access; storing the new document based on a result of the priority list in a storage tier of the hierarchical storage environment.

In further embodiments of the present invention, the set of keywords may comprise at least one of the following: keywords of a keywords section, authors, publisher, date or origin, and title.

In further embodiments of the present invention, the set of references may comprise at least one of the following: references of a references section, hyperlinks, and other documents titles.

In further embodiments of the present invention, the analyzing process may extend the enhanced metadata at least with one of the following information: user file access history and user search history.

In further embodiments of the present invention, the priority list may comprise at least one of the following sub lists: a first sub list comprising relation and/or references between different objects, second sub list comprising most frequent and/or recent accessed objects, and a third sub list comprising user based relations between different objects.

In further embodiments of the present invention, accessing a document may trigger a document access notification process that determines related documents based on the enhanced metadata and the priority list; places the related documents in a highest level storage tier, and updates the priority list; and the accessed document is retrieved.

In further embodiments of the present invention, an archiving process may determine documents that can be archived in a lower lever storage tier based on the enhanced metadata and the priority list.

In another general embodiment of the present invention, a hierarchical storage environment comprises at least two different storage tiers and a file system with a content related tiering engine comprising means for content scanning, content retrieving and content archiving. The content related tiering engine triggers a new document notification process in response to a received new document for storage. The content scanning means scans the received new document for a set of keywords and references; creates enhanced metadata for the new document including the scan result; and stores the metadata in the content related tiering engine. Further the content related tiering engine evaluates the enhanced metadata by a relationship analyzing process resulting in a priority list which defines a likelihood of possible access; and stores the new document based on a result of the priority list in a storage tier of the hierarchical storage environment.

In further embodiments of the present invention, the content related tiering engine may be implemented as a relational database management system to manage the enhanced metadata.

In further embodiments of the present invention, the content retrieving means may trigger a document access notification process that determines related documents based on the enhanced metadata and the priority list; places the related documents in a highest level storage tier; and updates the priority list; and retrieves the accessed document.

In further embodiments of the present invention, the content archiving means may run an archiving process to determine documents that can be archived in a lower lever storage tier based on the enhanced metadata and the priority list.

In yet another general embodiment of the present invention, a data processing program for execution in a data processing system comprises software code portions for performing a method for file handling in a hierarchical storage environment when the program is run on the data processing system.

In a further general embodiment of the present invention, a computer program product stored on a computer-usable medium, comprises computer-readable program means for causing a computer to perform a method for file handling in a hierarchical storage environment when the program is run on the computer.

Various embodiments of the present invention are thus able to enhance the performance of file retrieval processes in network attached storage (NAS) and make the file tiering process and restore more effective. The main idea is to extend enhanced metadata with results of a relationship analyzing process, which utilizes the search and/or data access behavior of users, for example, and links this to the content of the files. As such, user search, data access "behavior" and/or various metadata aspects are combined beyond what's available today. Accordingly, numerous embodiments of the present invention describe how the file retrieval, and in turn the archive process, can be optimized.

In particular, various embodiments of the present invention introduce a content related tiering engine that will manage the tiering more effectively. Instead of solely using the prior art metadata, the engine may link the user behavior to the file content. The latter may automatically be determined by scanning the actual content of the files (e.g. keywords and references). Before files are stored on the network attached storage (NAS) system, their metadata may be extended based on the outcome of the scan and the related user behavior. Thus, the content related tiering engine optimizes the management of file storage tiering.

One possible implementation to persist/store and manage the additional metadata in the proposed content related tiering engine is a Relational Database Management System (RDBMS). However, other means may be conceivable, such as those that would be recognized by one having skill in the art upon reading the present disclosure.

Additional embodiments of the present invention may also be applied to other applications domains such as WAN (Wide Area Network) caching of data between "home" and "remote" locations of the WAN (Wide Area Network).

Figure 1:
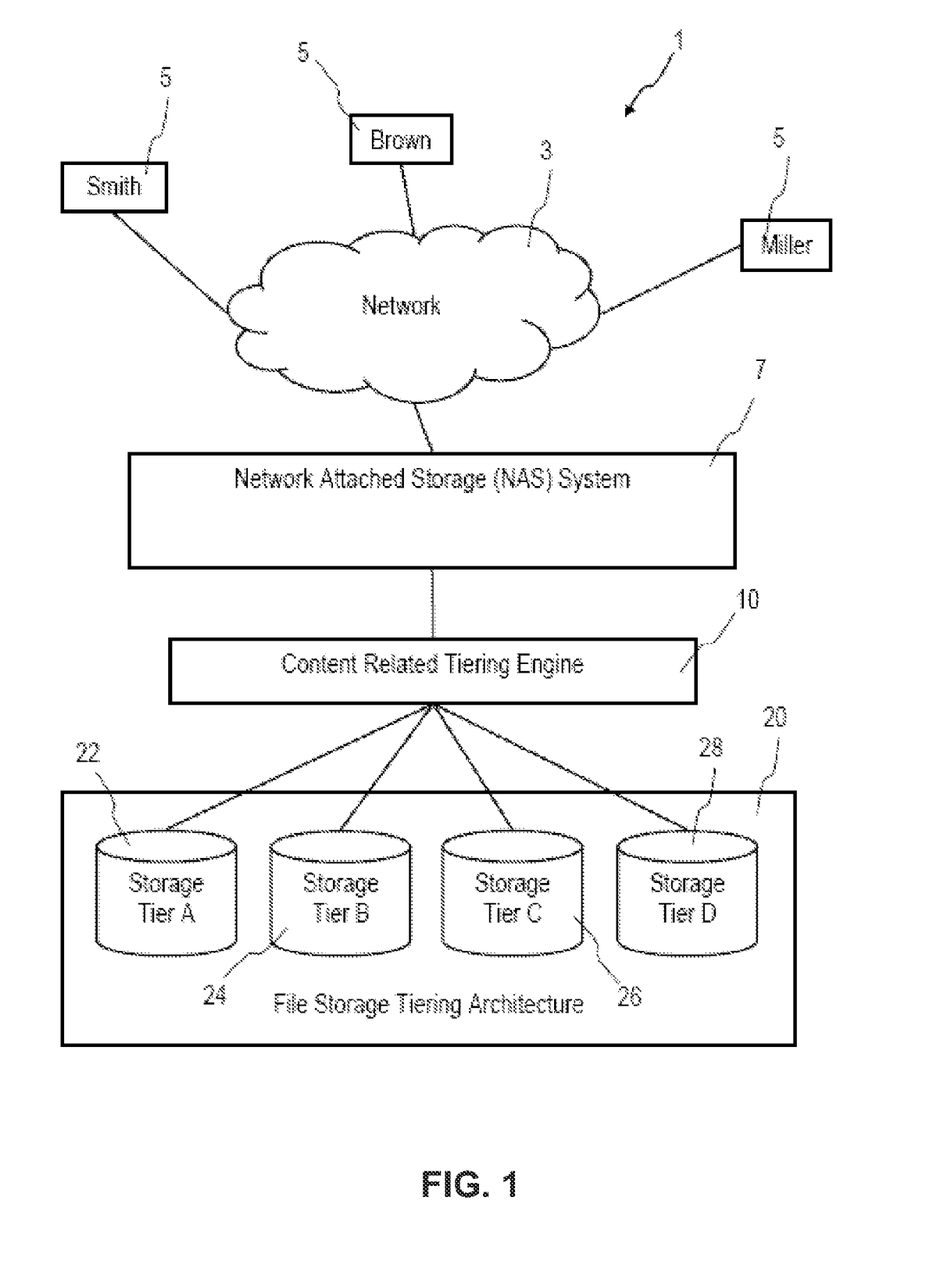
FIG. 1 is a schematic block diagram of a network environment comprising network attached storage (NAS) system with a hierarchical storage environment, in accordance with one embodiment.
Figure 2:
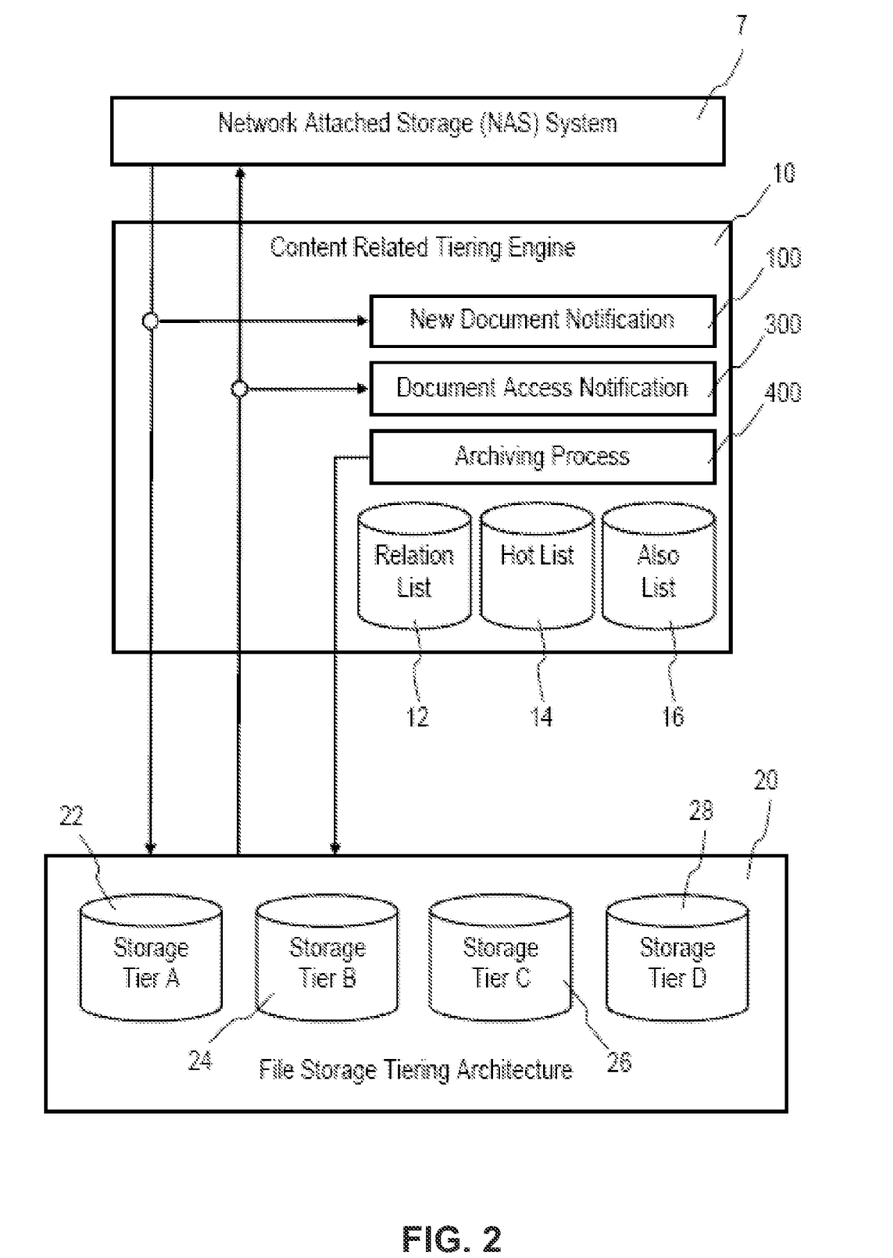
FIG. 2 is a schematic diagram of the network attached storage (NAS) system with a hierarchical storage environment of FIG. 1 in greater detail, in accordance with one embodiment.

FIG. 1 shows a network environment 1 comprising a network attached storage (NAS) system 7 with a hierarchical storage environment, in accordance with an embodiment of the present invention; FIG. 2 shows the network attached storage (NAS) system with a hierarchical storage environment of FIG. 1 in greater detail, in accordance with an embodiment of the present invention; and FIG. 3 shows a simplified database schema for a possible implementation of a content related tiering engine 10 of the hierarchical storage environment of FIGS. 1 and 2, in accordance with an embodiment of the present invention.

Figure 3:
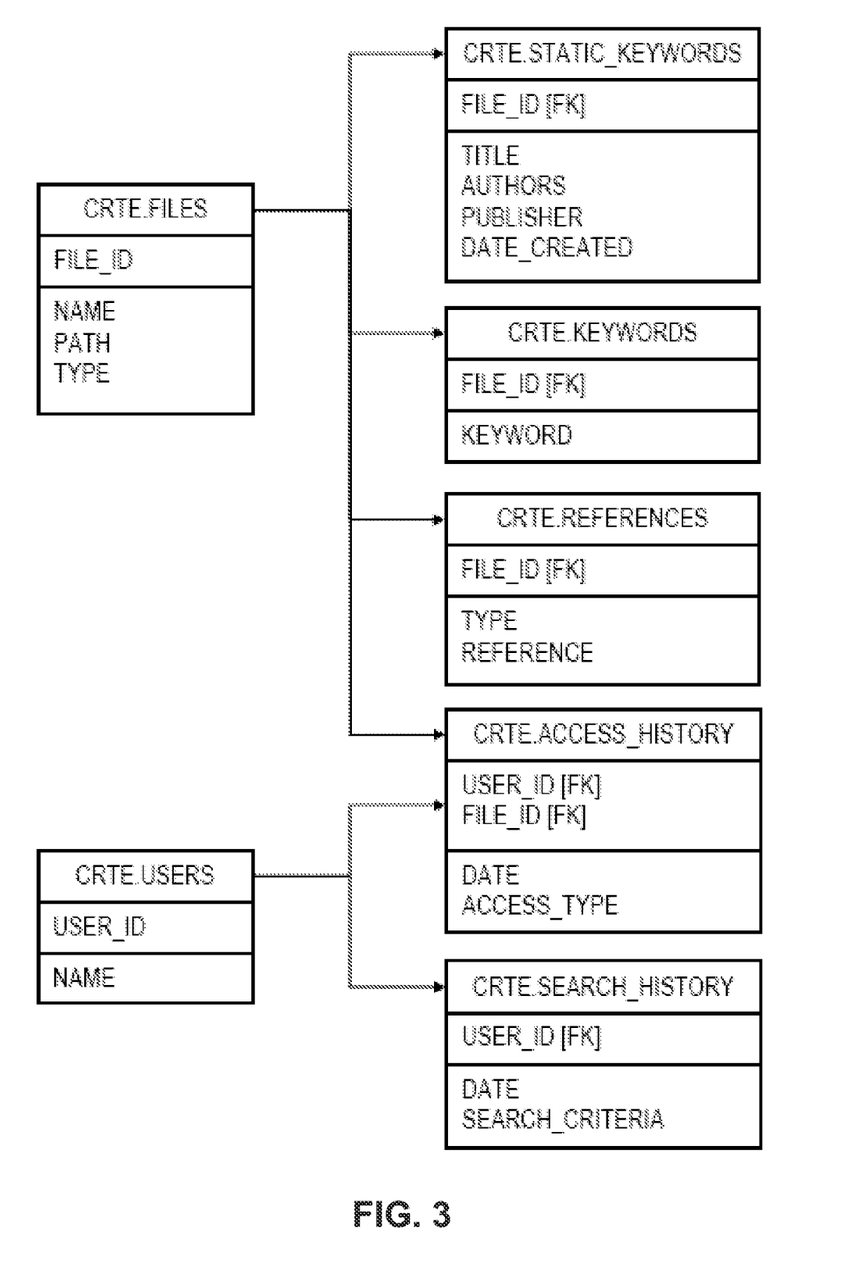
FIG. 3 is a simplified database schema for a possible implementation of a content related tiering engine of the hierarchical storage environment of FIGS. 1 and 2, in accordance with one embodiment.

Referring to FIGS. 1 to 3, the shown embodiment of the present invention employs a hierarchical storage environment comprising at least two different storage tiers 22, 24, 26, 28 and a file system with a content related tiering engine 10. In various approaches, the content related tiering engine 10 may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

The content related tiering engine 10 comprises means for content scanning 100, content retrieving 300 and content archiving 400. See e.g., FIG. 2. The content related tiering engine 10 triggers a new document notification process S100, shown in FIG. 4, in response to a received new document for storage. The content scanning means 100 scans the received new document for a set of keywords and references; creates enhanced metadata for the new document including the scan result; and stores the metadata in the content related tiering engine 10. The content related tiering engine 10 evaluates the enhanced metadata by a relationship analyzing process resulting in a priority list which defines a likelihood of possible access; and stores the new document based on a result of the priority list in a storage tier 22, 24, 26, 28 of the hierarchical storage environment.

Referring to FIGS. 1 and 2, the shown embodiment of network environment 1 shows three users 5 connected to a network 3 and the network attached storage (NAS) system 7 with the hierarchical storage environment, in accordance with an embodiment of the present invention, comprising the content related tiering engine 10 and a file storage tiering architecture 20 comprising four storage tiers 22, 24, 26, 28. Here the files are migrated from very fast disk storage media of a first storage tier A, which is a very fast "Gold" disk storage media, to lower cost media with less performance and/or longer response time of a second storage tier B, which is a fast "Silver" disk storage media, a third storage tier C, which is a slower "Bronze" disk storage media and fourth storage tier D, which is a tape. Here the tiering is based on migration and placement policies using the enhanced metadata of the content related tiering engine 10.

The enhanced metadata includes, but is not limited to, the following information: keywords of a keywords section of the scanned document, authors, publisher, date or origin, title, references of references section of the scanned document, hyperlinks such as URL addresses, other documents titles, user file access history, and user search history. Based on the specific file content the enhanced metadata may be extended by additional information of/from the priority list. The priority list comprises at least one of the following sub lists: a first sub list 12 also called "Relation List" comprising relation and/or references between different objects, a second sub list 14 also called "Hot List" comprising most frequent and/or recent accessed objects, and a third sub list 16 also called "Also List" comprising user based relations between different objects e.g. users retrieving object ID=123 also have retrieved object ID=345.

The content related tiering engine 10 manages the file storage using the means for content scanning 100, file retrieval using the means for content retrieving 300, and content related archiving using the means for content archiving 400. The content retrieving means 300 triggers a document access notification process S300, shown in FIG. 5, which determines related documents based on the enhanced metadata and the priority list; places the related documents in a highest level storage tier 22; and updates the priority list; and retrieves the accessed document. The content archiving means 400 runs an archiving process S400, shown in FIG. 6, to determine documents that can be archived in a lower lever storage tier 24, 26, 28 based on the enhanced metadata and the priority list.

One possible implementation to persist/store and manage the enhanced metadata in the proposed content related tiering engine (CRTE) 10 is a Relational Database Management System (RDBMS). Other forms may be conceivable such as those as would be recognized by one having skill in the art upon reading the present disclosure.

A simplified example for a possible database model is shown in FIG. 3 also including the users 5 of the systems and their access and search history. The network attached storage (NAS) system 7 will execute the storage tiering based on the metadata definitions. Here the content related tiering engine 10 is implemented as relational database management system to manage the enhanced metadata. Each file (CRTE.FILES) is identified uniquely by an Identification ID (FILE_ID). This can be done by means of prior art such as generating a unique file hash. The list of all files in the system is maintained in a table within the Relational Database Management System (RDBMS). The unique identifier is used to associate a file with the additional metadata maintained in additional tables (CRTE.Static_KEYWORDS; CRTE.KEYWORDS; CRTE.REFERENCES; CRTE.ACCESS_HISTORY; and CRTE.SEARCH_HISTORY).

In the shown embodiment, the content related tiering engine 10 uses four key methods. The content related tiering engine 10 uses management by keywords. This means, that each article or book; typically a file stored on network attached storage (NAS) system 7, contains a set of keywords (strings) by the time it is stored on the file storage tiering architecture 20. These keywords are added to the extended metadata of the file when it is initially stored in the network attached storage (NAS) system 7. When a user 5 requests an article or book (file), all other file objects that contain an identical key word set are automatically migrated in the highest level or "gold" storage tier A. Thus, they are already available in the faster storage tier 22 when the user 5 wants to access them and no further migrations or recalls are required.

Further the content related tiering engine 10 uses management by references. This means, that each article or book contains a list of references. When user 5 requests an article or book, all cited articles are automatically migrated to the highest level or "gold" storage tier A. Thus, they are already available in the faster storage tier 22 when the user 5 wants to access them and no further migrations or recalls are required.

Also, the content related tiering engine 10 uses management by history. This means that the content related tiering engine 10 maintains the file access history for each user 5. If a user 5 subsequently requests a document, the content related tiering engine 10 will identify users 5 that have accessed the same file and automatically retrieve documents according to the access history. For instance, reference is made to the following example, which is presented for illustration purposes only:

(1) User "Smith" retrieved document "one", "two" and "three".
(2) The content related tiering engine 10 stores this information as part of the access history.
(3) At a later time user "Brown" or "Miller" retrieves document "one".
(4) The content related tiering engine 10 scans the access history for access to document "one" and automatically retrieves "two" and "three" for user "Brown" or "Miller".

Further the content related tiering engine 10 uses management by search. This means, that in case users 5 perform a document search each or the top hits document that is part of the search will be automatically migrated to the highest level or "gold" storage tier A as well. When a user 5 performs a search for a file the content related tiering engine 10 will identify the top rated search results. The top rated files will be migrated or recalled automatically.

The above described content related tiering engine 10 can be used in network attached storage (NAS) products. This seems natural for object (files, documents, . . . ) as network attached storage (NAS) is managed on file level rather than block level which by itself has no notion of files.

In a preferred embodiment, the content related tiering engine 10 may be part of the network attached storage (NAS) system 7 and, as such, transparent to the users 5. However, in an alternative embodiment, the content related tiering engine 10 may be external to the network attached storage (NAS) system 7. In yet another embodiment, the content related tiering engine 10 may be shared between different network attached storage (NAS) systems 7, which permits even more powerful usages of the enhanced metadata concept and the content tiering methods.

Figure 4:
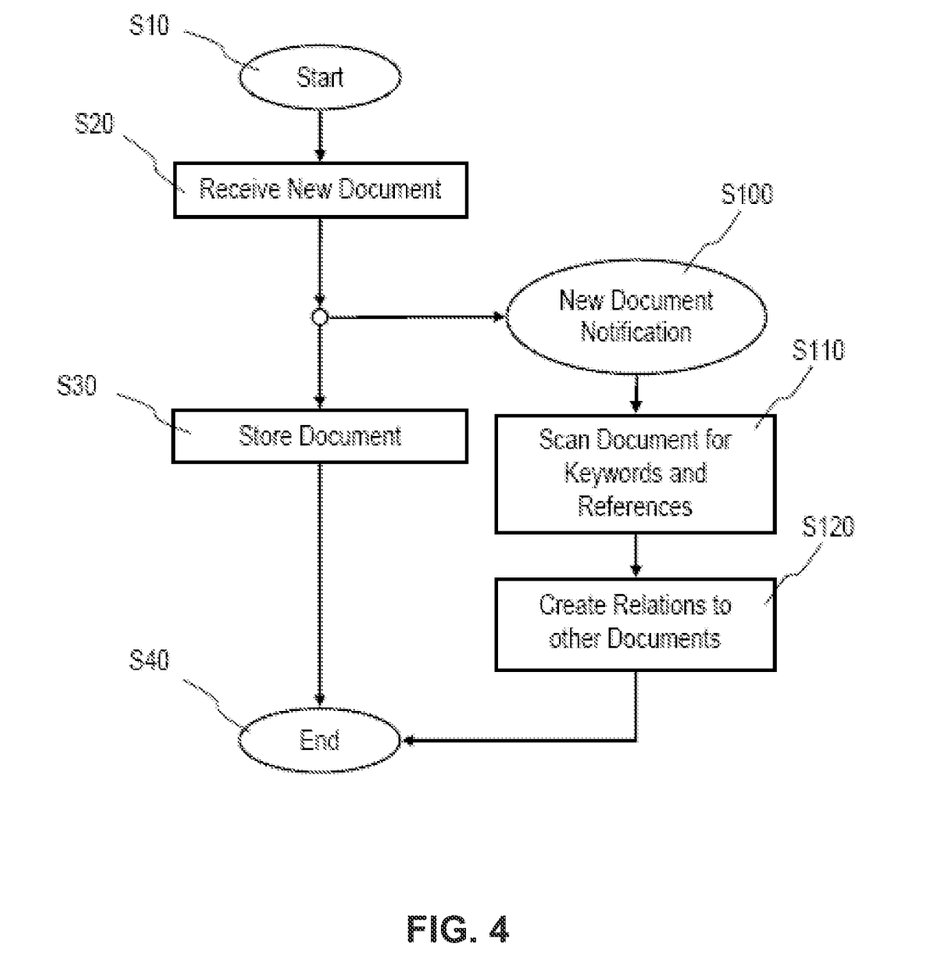
FIG. 4 is a schematic flow diagram of a file storage process being part of the method for file handling in a hierarchical storage environment, in accordance with one embodiment.
Figure 5:
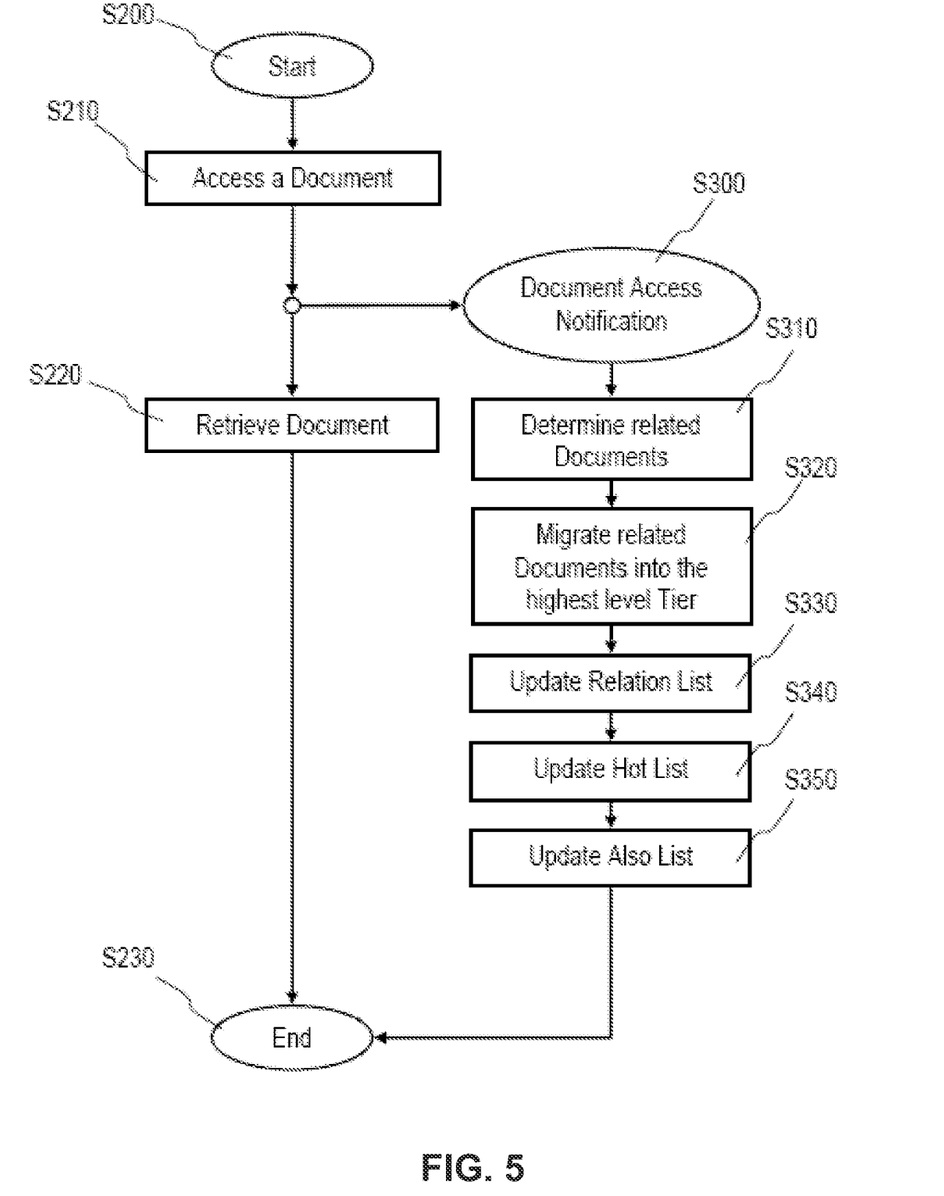
FIG. 5 is a schematic flow diagram of a file retrieval process being part of the method for file handling in a hierarchical storage environment, in accordance with one embodiment.
Figure 6:
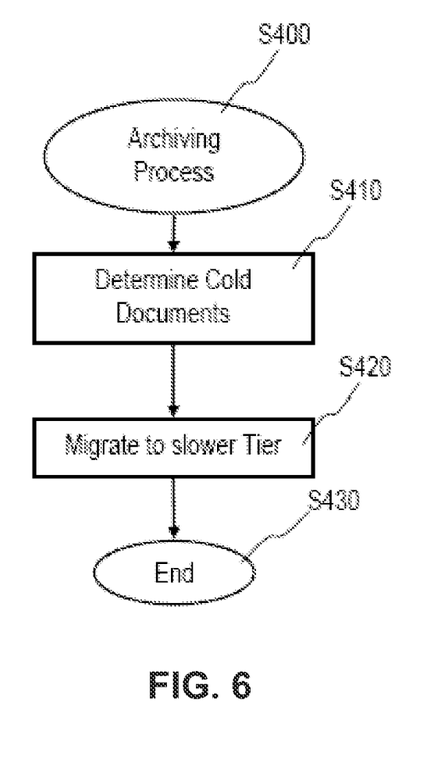
FIG. 6 is a schematic flow diagram of a file archiving process being part of the method for file handling in a hierarchical storage environment, in accordance with one embodiment.

FIG. 4 shows a file storage process being part of the method for file handling in a hierarchical storage environment, in accordance with an embodiment of the present invention; FIG. 5 shows a file retrieval process being part of the method for file handling in a hierarchical storage environment, in accordance with an embodiment of the present invention; and FIG. 6 shows a schematic flow diagram of a file archiving process being part of the method for file handling in a hierarchical storage environment, in accordance with an embodiment of the present invention.

FIG. 4 describes the file storage process started with step S10. After a new file or document for storage is received by the network attached storage (NAS) system 7 in step S20 the new file or document will be stored in step S30 and in turn the process end will be acknowledged. In parallel, a new file or document notification will be sent to the content related tiering engine 10 which performs a new document notification process in step S100. In step S110, the content related tiering engine 10 scans the received new file or document for a set of keywords and references using means for content scanning 100, for example. In step S120, the content related tiering engine 10 performs a relationship analyzing process resulting in a priority list which defines a likelihood of possible access and creates enhanced metadata for the new document including the scan result. The metadata is stored in a file system, e.g. in the content related tiering engine 10. The storing of the new document in a storage tier 22, 24, 26, 28 of the hierarchical storage environment 1 is based on a result of the priority list.

The notification of the content related tiering engine 10 may be created for example by using existing file system change notifications. One possible implementation is the "fschange" facility available on Linux operating systems. In such a scenario, step 110 may be triggered by a "CREATE <filename>" event. This may trigger a document scan, e.g. keywords and references, and relations to other document will be created in step S120. These relations and metadata information may be stored, for example, in the content related tiering engine 10.

During the file storage process the metadata may be extended based on the content of the file. The set of keywords comprises keywords of a keywords section of the document, authors, publisher, date or origin, and title, for example. The set of references comprises references of a references section of the document, Hyper Links, and other documents titles. The analyzing process may extend the enhanced metadata with the user file access history and the user search history. For example, the analyzing process may combine the enhanced metadata with at least with one of: user file access history and user search history, such that the enhanced metadata then includes the user file access history and/or the user search history.

FIG. 5 describes the file retrieval process started with step S200. After a file or document access is received in step S210, a corresponding file or document is retrieved in step S220 and migrated to the highest level tier A. In parallel, a file or document access notification will be sent to the content related tiering engine 10, which performs a document access notification process in step S300. Based on the enhanced metadata and the priority list, the content related tiering engine 10 evaluates related files or documents in step S310 using the content retrieving means 300, for example. The related files or documents will then be migrated in the highest level tier A in step S320. In steps S330, S340, S350, the content related tiering engine 10 updates the first sub list 12 or "Relation List", the second sub list 14 or "Hot List", and the third sub list 16 or "Also List" of the priority list, respectively.

FIG. 6 describes the content related archiving process started in step S400. In step S410, the content related tiering engine 10 determines files or documents that can be archived in a lower lever storage tier B, C, D based on the enhanced metadata and the priority list using the content archiving means 400. Here the enhanced content related metadata tables (CRTE.Static_KEYWORDS; CRTE.KEYWORDS; CRTE.REFERENCES; CRTE.ACCESS_HISTORY; and CRTE.SEARCH_HISTORY) of the Relational Database Management System (RDBMS) will be used to identify "cold" documents that can be archived in lower level storage tiers B, C, D.

At present, no such content related tiering file solutions are available or exist in prior art. Due to the novelties explained in the disclosure, this would add significant additional value to network attached storage (NAS) solutions.

The concepts and methods described in this invention can also be applied to WAN (Wide Area Network) caching environments. Here files are cached from a central (home) location to a remote (cache) location. Typical applications of this technique are branch offices which would comprise such a remote cache for the data. The data (files) are copied (synchronized) between the home and cache locations based on certain rules and policies. The concept and methods described in the context of storage tiering in network attached storage (NAS) systems can be applied in the same manner to such WAN caching environments. The new metadata concepts are used in addition, in order to synchronize data (files) between home and cache locations. One example is to also synchronize all references objects from home to cache. The probability of users accessing referenced objects from the cache which are automatically already made available in the cache will improve response/access time.

In conjunction with a tape library managed by TSM/HSM, the feature of File-List based migration/recall can be used to optimize the overall process performance. This feature optimizes the sequence of objects to be restored/migrate based on tapes and the actual position on each tape.

Embodiments of the present invention propose a new approach for managing file storage tiering based on the actual file content and access patterns. While this is illustrated by the usage in a network attached storage (NAS) environment, the concept can be embodied in other systems and application as well.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments disclosed herein have been presented for purposes of illustration, but are not intended to be exhaustive or limited to the embodiments disclosed. Many modifications and variations will be apparent to those of ordinary skill in the art without departing from the scope and spirit of the described embodiments. It will be further appreciated that embodiments of the present invention may be provided in the form of a service deployed on behalf of a customer to offer service on demand. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for file handling in a hierarchical storage environment, comprising:
   receiving a new document for storage;
   triggering and/or initiating a new document notification process upon receipt of the new document, the new document notification process comprising:
      scanning the new document for a set of keywords and/or references;
      creating enhanced metadata for the new document, wherein the enhanced metadata includes the set of keywords and/or references from said scanning;
      storing the enhanced metadata in a file system; and
      evaluating the enhanced metadata via a relationship analyzing process to produce a priority list defining a likelihood of possible access; and
   storing the new document in a storage tier of a hierarchical storage environment according to the priority list.

2. The method according to claim 1, wherein the set of keywords comprises at least one of: keywords from a keywords section, authors, publisher, date, origin, and title.

3. The method according to claim 1, wherein the set of references comprises at least one of: references from a references section, hyperlinks, and titles of referenced documents.

4. The method according to claim 1, wherein the relationship analyzing process includes in the enhanced metadata at least with one of: a user file access history and a user search history.

5. The method according to claim 1, wherein the priority list comprises at least one of the following: a first sub list including relations and/or references between different objects, a second sub list including frequently and/or recently accessed objects, and a third sub list including user based relations between different objects.

6. The method according to claim 1, further comprising:
   accessing the new document;
   triggering and/or implementing a document access notification process upon accessing the new document, the document access notification process comprising:
      determining documents that are related to the new document based on the enhanced metadata and the priority list;
      placing the related documents in a highest level storage tier of the hierarchical storage environment; and
      updating the priority list; and
   retrieving the accessed new document.

7. The method according to claim 1, further comprising implementing an archiving process, wherein the archiving process comprises:
   determining one or more documents stored in the hierarchical storage environment that can be archived in a lower lever storage tier based on the enhanced metadata and the priority list; and
   archiving the determined one or more documents.

8. A hierarchical storage environment, comprising:
   at least two different storage tiers; and
   a file system with a content related tiering engine, wherein the content related tiering engine is configured to:
      trigger and/or implement a new document notification process in response to a received new document for storage;
      scan the new document for a set of keywords and/or references;
      create enhanced metadata for the new document, wherein the enhanced metadata includes the set of keywords and/or references from said scan;
      store the enhanced metadata in the content related tiering engine;
      evaluate the enhanced metadata via a relationship analyzing process to produce a priority list defining a likelihood of possible access; and
      store the new document in a storage tier of the hierarchical storage environment according to the priority list.

9. The hierarchical storage environment according to claim 8, wherein the content related tiering engine comprises a relational database management system configured to manage the enhanced metadata.

10. The hierarchical storage environment according to claim 8, wherein the enhanced metadata comprise at least one of: keywords from a keywords section, authors, publisher, date, origin, title, references from a references section, hyperlinks, titles of referenced documents, user file access history, and user search history.

11. The hierarchical storage environment according to claim 8, wherein the priority list comprises at least one of: a first sub list comprising relation and/or references between different objects, a second sub list comprising frequently and/or recently accessed objects, and a third sub list comprising user based relations between different objects.

12. The hierarchical storage environment according to claim 8, wherein the content related tiering engine content is further configured to:
   trigger and/or implement a document access notification process in response to a request to access the new document;
   determine documents that are related to the new document based on the enhanced metadata and the priority list;
   place the related documents in a highest level storage tier of the hierarchical storage environment;
   update the priority list; and
   retrieve the new document.

13. The hierarchical storage environment according to claim 8, wherein the content related tiering engine content is further configured to:

implement an archiving process to determine one or more documents stored in the hierarchical storage environment that can be archived in a lower lever storage tier based on the enhanced metadata and the priority list; and archive the determined one or more documents.

14. A data processing program for execution in a data processing system comprising software code portions for performing the method according to claim 1 when the data processing program is run on the data processing system.

15. A computer program product, comprising:
a computer readable storage medium having program code embodied therewith, the program code readable and/or executable by a processor to cause the processor to:
receive a new document for storage;
initiate a new document notification process upon receipt of the new document, the new document notification process comprising:
scanning the new document for a set of keywords and/or references;
creating enhanced metadata for the new document, wherein the enhanced metadata includes the set of keywords and/or references;
storing the enhanced metadata in a file system; and
evaluating the enhanced metadata via a relationship analyzing process to produce a priority list defining a likelihood of possible access; and
store the new document in a storage tier of a hierarchical storage environment according to the priority list.

* * * * *